US006606557B2

(12) United States Patent
Kotzin

(10) Patent No.: US 6,606,557 B2
(45) Date of Patent: Aug. 12, 2003

(54) METHOD FOR IMPROVING DISPATCH RESPONSE TIME

(75) Inventor: Michael D. Kotzin, Buffalo Grove, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/008,634

(22) Filed: Dec. 7, 2001

(65) Prior Publication Data

US 2003/0109985 A1 Jun. 12, 2003

(51) Int. Cl.7 ............................ G01C 21/34; G01S 3/02
(52) U.S. Cl. ........................ 701/209; 701/117; 701/213
(58) Field of Search ................................ 701/209, 210, 701/213, 117; 342/357.09, 357.1, 357.07; 340/988, 995, 989, 992

(56) References Cited

U.S. PATENT DOCUMENTS

| | | | | |
|---|---|---|---|---|
| 5,122,959 A | * | 6/1992 | Nathanson et al. | 701/117 |
| 5,168,451 A | * | 12/1992 | Bolger | 701/117 |
| 5,371,678 A | * | 12/1994 | Nomura | 701/210 |
| 5,493,694 A | * | 2/1996 | Vlcek et al. | 455/521 |
| 5,835,376 | * | 11/1998 | Smith et al. | 701/117 |
| 5,845,227 A | * | 12/1998 | Peterson | 701/209 |
| 5,959,577 A | * | 9/1999 | Fan et al. | 342/357.13 |
| 6,088,648 A | * | 7/2000 | Shah et al. | 701/117 |
| 6,233,517 B1 | * | 5/2001 | Froeberg | 701/117 |
| 6,339,745 B1 | * | 1/2002 | Novik | 701/208 |
| 6,421,602 B1 | * | 7/2002 | Bullock et al. | 701/201 |

FOREIGN PATENT DOCUMENTS

JP 2000-180189 * 6/2000

* cited by examiner

*Primary Examiner*—Michael J. Zanelli
(74) *Attorney, Agent, or Firm*—Roland K. Bowler, II; Lawrence J. Chapa

(57) ABSTRACT

A dispatch system generally provides a means for collecting destination information, selecting a dispatch assignment (104) to be dispatched to the destination (102) and dispatching the selected assignment. In situations where the response time of the assignment is a critical factor, selecting the assignment with the shortest response time is desired. An improved method for improving response time of an assignment with the shortest response time incorporates assignment location, a road condition associated with each assignment, and the traffic conditions associated with each assignment. Event information is also considered in determining the best route and travel time from the mobile entity to the destination.

10 Claims, 2 Drawing Sheets

METHOD FOR IMPROVING DISPATCH RESPONSE TIME

BACKGROUND OF THE INVENTION

Dispatching services to the intended recipient whether it be for emergency needs or commercial type services has a general need to decrease response time. There are several factors effecting the response time in location based services. First there is the relative location of the service provider and the recipient. A second factor is that highway congestion is variable and unpredictable. Third, is the number of delivering units available from the service provider. Each of these elements adds significant variability to the response time by the service provider. Response time is obviously more critical in emergency situations but it also has a significant impact on commercial services as well.

In general, a typical dispatch system is comprised of a dispatch control, a dispatch assignment, a dispatch destination and a means for communicating therewith. The dispatch assignment delivers the service of interest, such as providing care to the customer or delivering products to the end destination. The dispatch assignment may be an ambulance or a delivery vehicle which needs to reach the dispatch destination to complete the transaction. A request for service is made by the customer and this request is relayed to the appropriate dispatch assignment. The dispatch assignment the moves to the dispatch destination to deliver the product or service.

The time it takes from a customer's request until the dispatch assignment arrives at the dispatch destination is critical in both emergency and product or service delivery. In an emergency context, the customer may have a life-threatening situation and time for the dispatch assignment to reach the dispatch destination is obviously critical. Time is also critical in a commercial circumstance for numerous reasons. The product itself may introduce time constraints and require a minimal transport time, resource optimization is of interest to the service provider in order to improve capitalization from a business standpoint and customer satisfaction in terms of wait time is another business consideration.

One method for improving dispatch time is to choose the closest dispatch assignment from a plurality of dispatch resources, to the service destination. This may be the simplest approach however this does not take into account several factors. Highway congestion and the location of the dispatch resources can have a significant effect on the travel time of the dispatch resources. For example a dispatch resource may be located on slow moving back roads which will hinder response time as well as introduce greater variability, as opposed to a dispatch resource which may be further away but nonetheless, located on a fast moving highway and have a much quicker response time. Therefore an improved method for dispatching is required.

DESCRIPTION OF THE INVENTION

The present invention may be applied to various forms of transportation routing and delivery systems. These systems are typically called dispatch systems when several delivery options or dispatch assignments are available and in most cases controlled by a central dispatch control center. The present invention is a method for selecting a route. And a best route is determined for a traveler that is a movable entity such as a dispatch assignment or other vehicle. The dispatch assignment would be selected from a plurality of dispatch resources. The dispatch assignment is chosen by the fastest response time or best route to a dispatch destination which is determined by first determining a geographical location of a dispatch destination. This is followed by determining a geographical location of each dispatch resource of a plurality of dispatch resources. Then the method calculates a shortest distance from the dispatch resources 104 to the dispatch destination 102. Next the method determines the traffic conditions associated with each said dispatch resource 104 as said dispatch resource 104 travels to said dispatch destination 102. This is followed by determining a roadway position for each dispatch resource 104 and then estimating a response time of each said dispatch resource 104 from said plurality of dispatch resources 104 based on said roadway position, said traffic conditions, and said shortest distance to said dispatch destination. Finally the method calls for selecting the dispatch assignment with the shortest response time.

Figure 1:
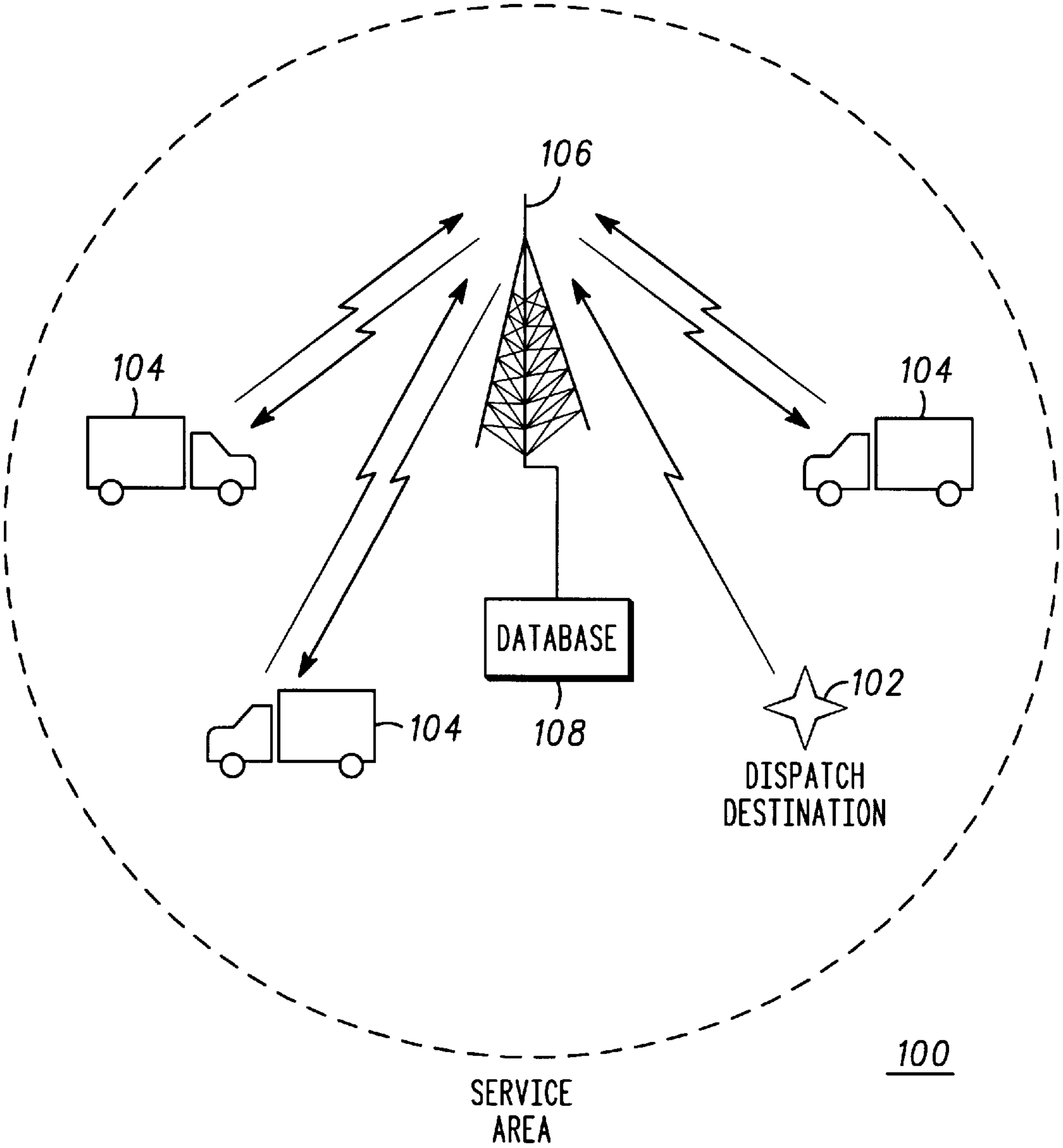
FIG. 1 is a diagram of a typical dispatch system showing the dispatch assignments and the dispatch destination in relation to one another in general.

Turning to FIG. 1, a dispatch system 100 is shown. A dispatch destination 102 is the location of the service or delivery requester in which the services or products are to be delivered. The mode of delivery of the services or product is the dispatch resource 104. A star depicts the dispatch destination 102 and the dispatch resources 104 are represented by delivery truck icons, three for simplicity sake. The number of dispatch resources 104 will vary from system to system depending on the requirements of the service provider.

Dispatch services can employ pedestrian carrier services as well as powered transportation delivery services such as motor vehicles or airplanes for example. As location determination becomes economical and more widely used it has become more feasible to use in more and more commercial services. The United States Federal Communications Commission (FCC) has required that cellular communication handsets must be geographically locatable by the year 2001. This capability is desirable for emergency systems such as Enhanced 911 (E911). The FCC requires stringent accuracy and availability performance objectives and demands that cellular communication handsets be locatable within 100 meters 67% of the time for network based solutions and within 50 meters 67% of the time for handset based solutions.

There are other means available for enabling location based services by establishing the location determination capability in handheld user devices such as Infrastructure aided GPS location systems, triangulation within cellular radiotelephone systems, the latter giving poor results when it comes to accuracy.

The invention is operative with any mode of transport that has a means for determining its geographical position that updates on a regular frequency. There are a plurality of methods and apparatus to determine the location of a dispatch resource 104. Currently standalone GPS units come in handheld portable configurations and can be transported anywhere. GPS systems are also emerging as options in the automotive industry, currently in high-end vehicles and should become common in all vehicles in the near future for navigational purposes. GPS systems are standard on all new commercial aircraft and becoming very popular in private and smaller commercial aircraft. Cellular radiotelephones have the capability to locate or be located by monitoring subscriber unit (SU) transmissions at several base stations and calculating SU position based on time of arrival measurements, or the SU will incorporate GPS electronics therein as required by the FCC for all new cellular radiotelephone in 2001. Another method and apparatus for determining the location of a SU is to incorporate a Global Positioning System (GPS) receiver into the SU. The GPS receiver is capable of receiving signals from a GPS satellite constellation in a high earth orbit and deriving location data therefrom.

A dispatch resource 104, such as a delivery truck, has a GPS receiver incorporated therein for determining the geographical location thereof. The location of a first dispatch resource 104 determined by the GPS receiver is transmitted back to a dispatch center 106. At the dispatch center 106, the location of all dispatch resources 104*s* of the dispatch system are collected into a resource database 108 and the positional information is continuously updated over time at a predetermined interval. The predetermined update interval can range from seconds to minutes as long as the resolution is sufficient to provide accurate location information. For example the predetermined update interval may be variable, as to effectuate power management, and wherein the dispatch assignment is moving very slowly or static and it is not necessary to update position as compared to a dispatch assignment moving at a high rate of speed requires a high location update rate.

Also in the dispatch assignment or the vehicle and connected with the GPS is a user interface that displays a map of the local area and the destination requested or assigned. This provides the feedback to the drive of the routes considered as well as the best route and the elements considered in selecting that route.

Many attributes affect the route and can in turn affect travel time. Normal congestion, rush hour, road construction, are some regularly occurring every day travel adversities. However, there are other pseudo random, transient or permanent yet predictable events or adversities that affect route and travel time. These events comprise large events such as sports games, concerts, and any other events that have the potential to increase congestion and can be accounted for in traffic congestion or routing systems.

A database (this may be the same database or at least linked to the database) is regularly updated with events, scheduled or unscheduled, and the location of the event. Routes near to and known to be affected by events at that location are stored in the database as well. This is especially important where there is an event and traffic data is not readily available for the corresponding roads near the event. The time the event takes place, start and end time, plus a tolerance which is dependant on the event type and estimated number of people attending, also stored with the given event, are then entered into the travel time calculation for each given route. The system can now take into account travel times for avoiding the event as well as providing the fastest route to the event, while avoiding the heaviest congestion. As traffic tracking systems update on a regular basis, this can happen real time by updating the database at the appropriate frequency to accommodate changes in traffic conditions and routes.

Figure 2:
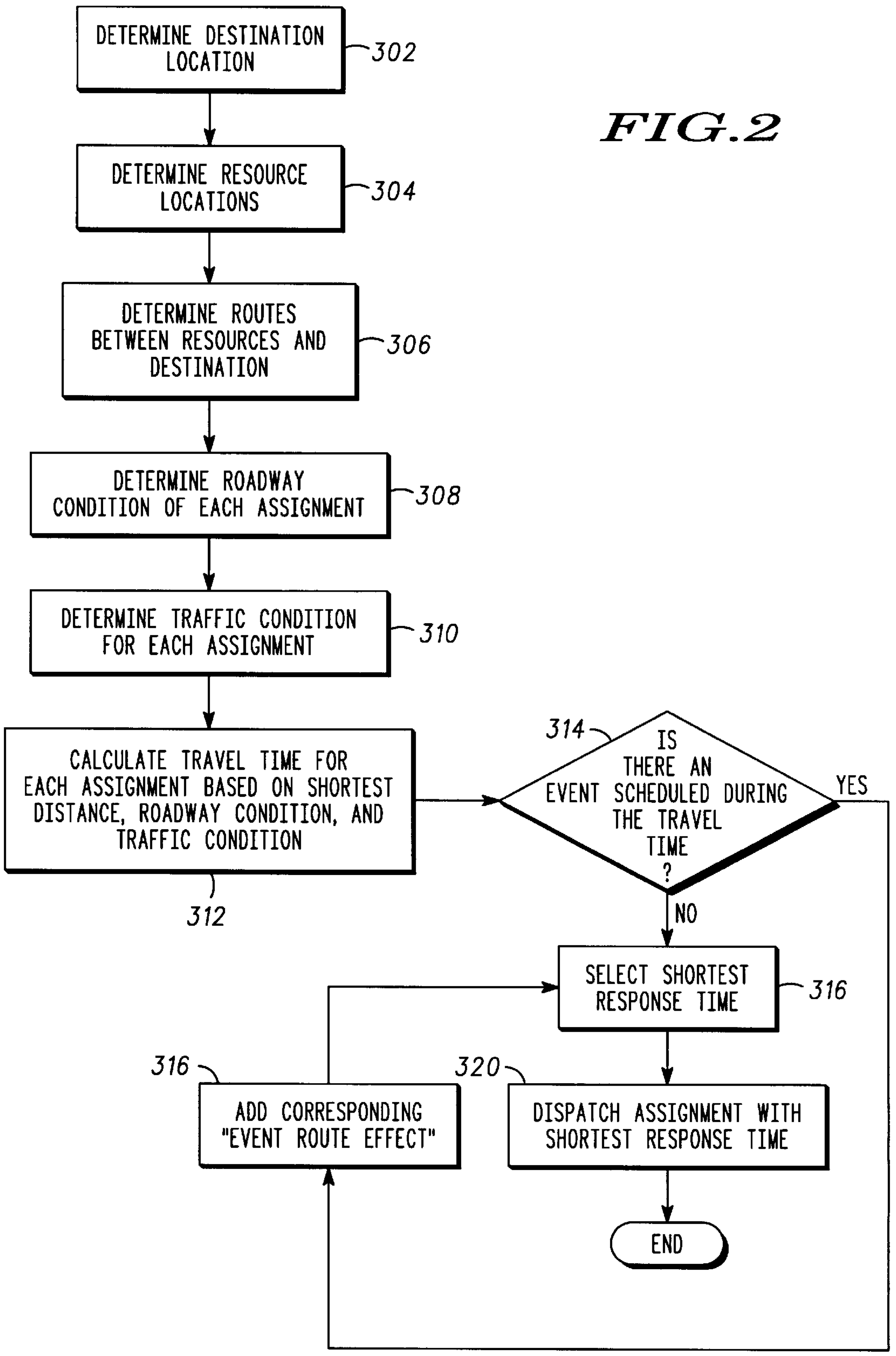
FIG. 2 is a flow chart illustrating the steps taken when determining the travel time.

FIG. 2 shows the general process flow for determining the travel time from the mobile entity or dispatch resource to the destination. First the destination is geographically determined 320. Then the location of a mobile entity or dispatch resources 104 is determined 304. At step 306, the available routes from the mobile entity 104 to the destination 102 are determined. Then the roadway conditions of each route are determined at 308 and the traffic conditions determined at 310. Based on the conditions, a travel time for each route and for each mobile entity are calculated at step 312. Now the system takes into account any transient affects that are adverse to the travel time. At step 314, the calculated travel time in step 312 is compared to the start and end time of events in the vicinity of any of the determined routes of step 306. If there is a correlation, then an event route affect is calculated based on the event characteristics 316. If there is no event scheduled or once the event route affect has been determined, then the shortest travel time is selected in 318. In the case of a dispatch, the assignment of the dispatch resource is made in 320 and the destination reached in 322.

The event data can be pre-programmed for the events that are scheduled in advance such as sports events or concerts or updated in real time as unexpected events occur. The system can better mange the traffic once a history is established on the traffic data and correlated to location, event type, size, duration and other critical factors. The history data can then better predict travel time in the future based on similar event characteristics. As more data is collected and utilized, the travel time predictions can be reiteratively improved in conjunction with true travel time collected at the time of the event.

Another attribute that affect the route that is most desirable is known problem areas that may be adverse for reasons other than congestion such as "bad parts of town." This can be determined by crime statistics or known areas in general to be adverse to the average driver. Alternatively, a drive may want to stay in neighborhoods that are more familiar or to avoid certain types of roads such as toll roads or multilane expressways or single lane side roads. This can be automatic given a certain theme setting or programmed into the system.

Traffic congestion on the roads can be determined from sensors in the highway system, or GPS systems in vehicles on the roadways. This data is currently collected for traffic reports broadcast on public radio and television systems. Also available through these systems is construction information. This information provides real time traffic conditions including traffic rates on each roadway and even within specific portions of the roadway. This information is also commonly collected along with dispatch recourse locations information in a central location. The traffic condition information is then correlated with dispatch resources 104 within a given programmable area.

The information received from the traffic information service can then be collated and collected in the resource database 108. Roadway selections for each route are combined to make up the route of a set of routes. The times from the traffic information service are matched to each corresponding roadway of which road set to make up a travel time for each road set. This is updated at a regular interval that is equal to the appropriate rate of change of the travel times associated with each roadway. The location information will then be used in a response time calculation upon the receipt of a dispatch request to make a dispatch assignment.

Incorporating all of the above information into a system that delivers travel times and route information can vastly improve travel, whether it is for personal business or commerce. The combination of known locations of a movable entity and the destination in concert with the traffic conditions, transient events, and other adversities in the highway system provides the critical information is route delivery trucks or provide the every day traveler the least frustrating path to the desired destination.

While the invention has been described in detail above, the invention is not intended to be limited to the specific embodiments as described. It is evident that those skilled in the art may now make numerous uses, modifications of, and departures from the specific embodiments described herein without departing from the inventive concepts.

I claim:

1. A method for selecting a dispatch assignment from a plurality of dispatch resources such that the fastest response time to a dispatch destination is achieved, the method comprising:

determining a geographical location of a dispatch destination;

determining a geographical location of a dispatch resource of a plurality of dispatch resources and a set of potential routes from at least two dispatch assignments from said plurality of dispatch assignments to said dispatch destination;

calculating a shortest route from said dispatch resource to said dispatch destination;

determining a traffic condition associated with each said dispatch resource of said plurality of dispatch resources between said dispatch resource and said dispatch destination;

estimating a response time of each of said dispatch resources from said plurality of dispatch resources based on a roadway condition of said dispatch resource, said traffic condition, and a shortest distance to said dispatch destination; and selecting the dispatch assignment with the shortest response time.

2. The method of claim 1 wherein said geographical location of said each dispatch resource is determined by Global Positioning System (GPS) information.

3. The method of claim 2 wherein said GPS information is transmitted from a cellular radiotelephone located at said each dispatch resource.

4. The method of claim 1 wherein said shortest distance is a lowest roadway mileage.

5. The method of claim 1 wherein traffic condition information is provided by a traffic service.

6. The method of claim 1 wherein said roadway condition is further comprised of a roadway hierarchy providing said roadway condition with a road level.

7. The method of claim 6 wherein said road level is determined by road size, road location, speed limit and number of lanes.

8. The method of claim 5 wherein said traffic condition comprises the average traffic speed.

9. A method of selecting the fastest dispatch route from at least one dispatch assignment to at least one dispatch destination, said method comprising:

tracking the relative geographical position of a plurality of dispatch resources;

identifying the geographical position of a dispatch destination relative to said plurality of dispatch resources;

determining a set of routes from said plurality of dispatch resources to said dispatch destination;

determining a traffic condition of each route of a set of possible routes;

calculating the travel time of said each route of said set of routes; and selecting a route from a first set of possible routes with the lowest travel time.

10. The method of claim 9 further comprising receiving geographical position information from said plurality of dispatch resources determined by GPS.

* * * * *